United States Patent [19]
Stout et al.

[11] 3,797,850
[45] Mar. 19, 1974

[54] AXLED VEHICLE SUPPORT FRAME ASSEMBLY

[75] Inventors: Richard W. Stout, Elkhart; Milton J. Brunk, Goshen, both of Ind.

[73] Assignee: Stoutco, Inc., Bristol, Ind.

[22] Filed: June 12, 1972

[21] Appl. No.: 262,116

[52] U.S. Cl............... 280/106 T, 280/495, 105/397
[51] Int. Cl............................................. B62d 63/08
[58] Field of Search ........ 280/106 R, 106 T, 124 R, 280/495; 105/397, 404; 180/64 R

[56] References Cited
UNITED STATES PATENTS

| | | | |
|---|---|---|---|
| 3,282,603 | 11/1966 | Barth | 280/106 T |
| 924,941 | 6/1909 | Schmidt | 280/106 R |
| 2,942,561 | 6/1960 | Cheshire | 105/404 |
| 2,719,726 | 10/1955 | Johnston | 280/124 R |
| 2,150,066 | 3/1939 | Kalb | 280/495 |
| 2,982,580 | 5/1961 | Lewis | 280/106 T |

Primary Examiner—Philip Goodman
Assistant Examiner—John A. Carroll
Attorney, Agent, or Firm—Oltsch and Knoblock

[57] ABSTRACT

An axled vehicle support frame assembly which includes two parallel longitudinal frame members, each having front and rear end portions tapering from a middle portion of maximum depth. Each longitudinal frame member has its front end joined to a divergent frame member which constitutes a part of a trailer tongue. The frame assembly includes side rails which are spaced laterally outwardly from the longitudinal frame members and which are connected to the frame members. The side rails are positioned at or above the lower periphery of the longitudinal frame members and do not extend below such frame members.

3 Claims, 4 Drawing Figures

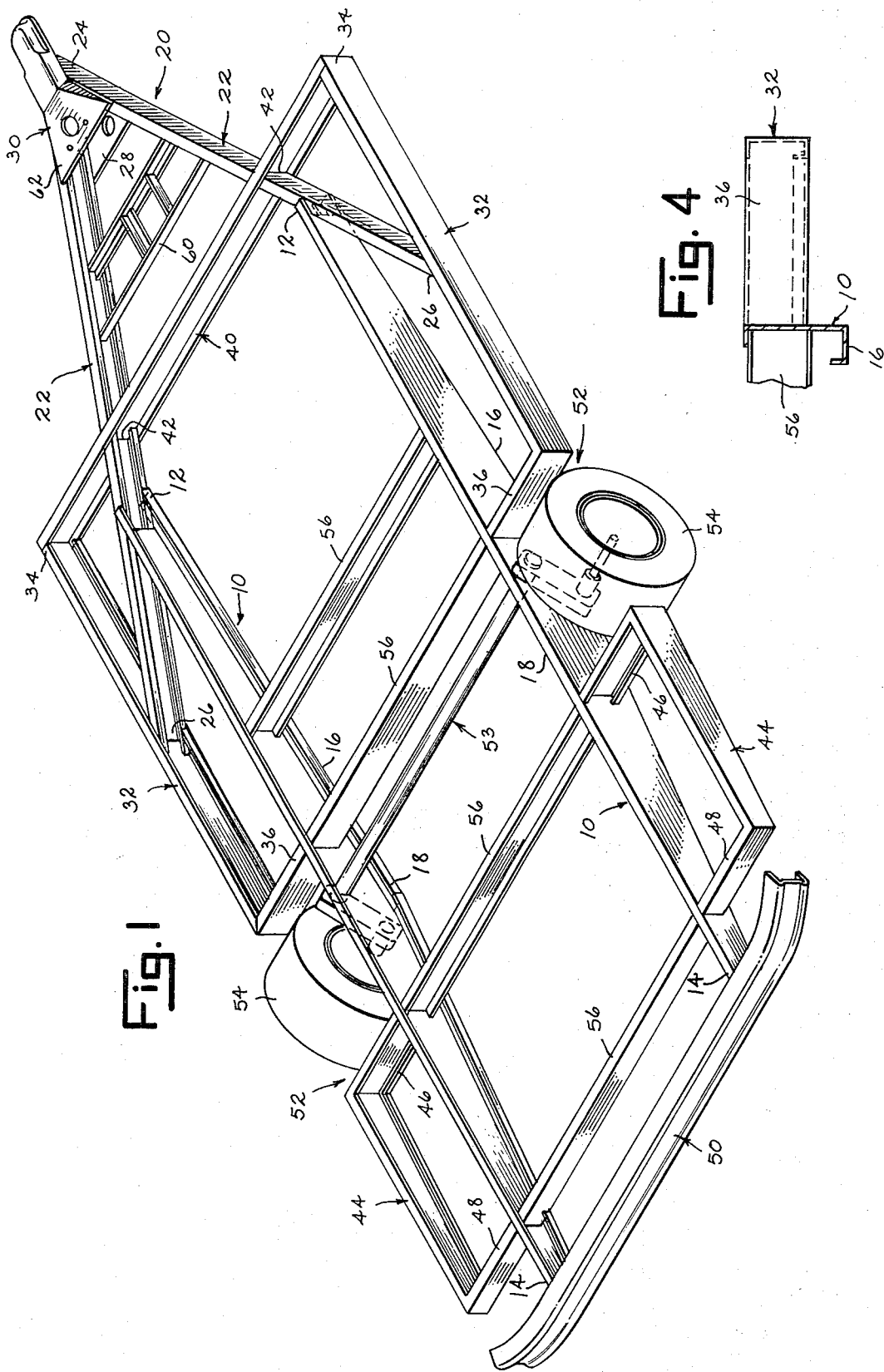

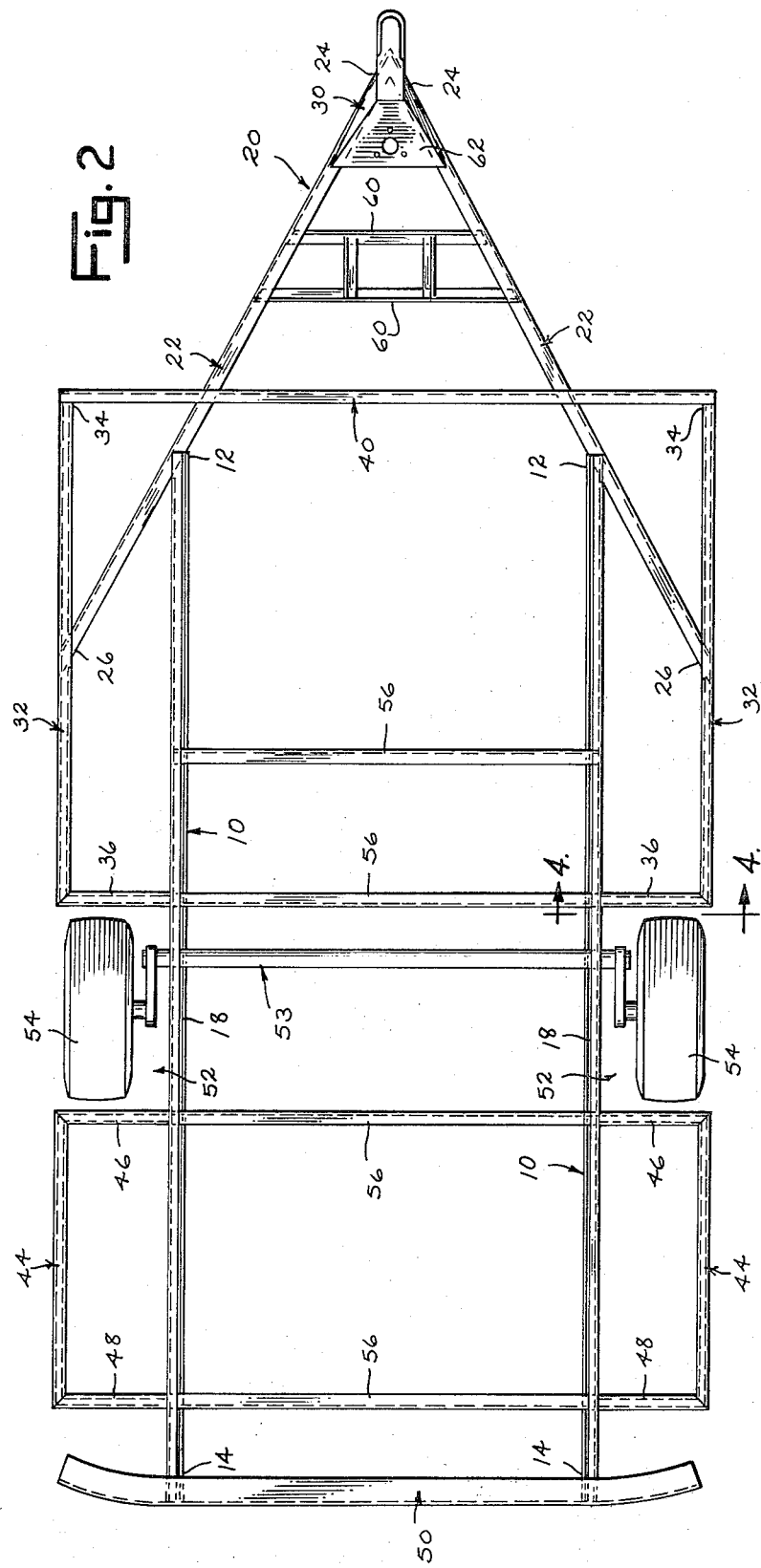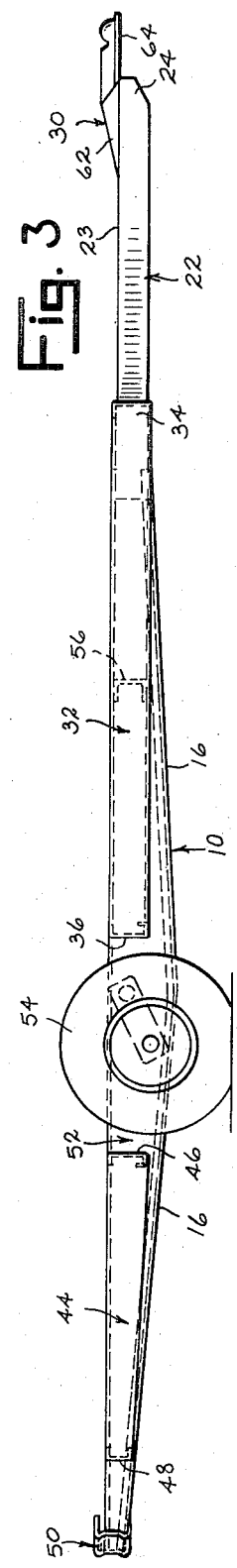

AXLED VEHICLE SUPPORT FRAME ASSEMBLY

SUMMARY OF THE INVENTION

This invention relates to an axled vehicle support frame assembly which will have application in the mobile home, travel trailer, camper and similar vehicle manufacturing arts.

In this invention, the frame assembly includes two parallel longitudinal frame members each having front and rear end portions which taper outwardly from a middle portion of maximum depth. Perimeter frame members are carried by the longitudinal frame members and are positioned at or above the lower periphery of the longitudinal frame members so as to permit maximum road clearance at each end of the frame assembly in combination with a low frame profile.

Accordingly, it is an object of this invention to provide an axled vehicle support frame assembly having a low profile with maximum road clearance at the front and rear ends of the assembly.

It is another object of this invention to provide a frame assembly for a trailer or similar towed vehicle having front and rear end sections which are designed in relationship to a trailer tongue and a centrally supported wheel and axle combination to provide maximum road clearance.

Still another object of this invention is to provide an axled vehicle support frame assembly which is of a low profile with sufficient ground clearance and of economical construction.

Other objects of this invention will become apparent upon a reading of the invention's description.

BRIEF DESCRIPTION OF THE DRAWINGS

A preferred embodiment of this invention is chosen for purposes of illustration and description wherein:

FIG. 1 is a perspective view of the illustrated frame assembly.

FIG. 2 is a top plan view of the frame assembly of FIG. 1.

FIG. 3 is a side view of the frame assembly of FIG. 1.

FIG. 4 is a fragmentary sectional view taken along line 4—4 of FIG. 2.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The illustrated frame assembly includes two parallel longitudinal frame members 10. Each longitudinal frame member 10 includes a forward end 12 and a rear end 14. The end portions of each frame member 10 are tapered toward ends 12 and 14 along the bottom edge 16 of the frame member from a central or middle frame member portion 18 of maximum depth. A trailer tongue, designated generally by the reference numeral 20, is connected to longitudinal frame members 10. Trailer tongue 20 includes forwardly converging frame members 22 each having forward end 24 and a rear end 26. Tongue frame members 22 are structurally joined at their convergent forward ends 24 by a lower gusset plate 28 and a coupler 30. The forward end 12 of each longitudinal frame member 10 is joined to a tongue frame member 22 intermediate its ends 24 and 26.

A pair of side rails 32 are connected between trailer tongue 20 and longitudinal frame members 10. Each side rail 32 is spaced laterally outwardly of a longitudinal frame member 10 and includes a forward end 34 which extends forwardly of rear end 26 of the adjacent tongue frame member 22 and a rear end 36 which is inturned and joined to the adjacent longitudinal frame member 10 just forwardly of central portion 18 of the frame member. Rear end 26 of each tongue frame member 22 is connected to a side rail 32 between ends 34 and 36 of the side rail. A front transverse rail 40 is located spacedly forwardly of forward ends 12 of frame members 10 and has each of its ends connected to a forward end 34 of a side rail 32. Trailer frame members 22 extend through openings 42 in front transverse rail 40 and are preferably welded or otherwise bonded to rail 40 about the openings therein.

A pair of side rails 44 are also connected to longitudinal frame members 10. Each side rail 44 is positioned laterally outwardly of a longitudinal frame member 10 and includes an inturned forward end 46 which connects to the adjacent frame member 10 and which is positioned rearwardly of central portion 18 of the frame member. The rear end 48 of each side rail 44 is also inturned and is connected to the adjacent frame member 10 near its rear end 14. A bumper or similar rear transverse rail 50 is connected across rear ends 14 of frame members 10.

The space between inturned rear ends 36 of side rails 32 and inturned front ends 46 of side rails 44 at each side of the frame assembly defines a wheel well 52 which is located at the frame member's central portion 18. An axle assembly 53 is secured to frame members 10 and includes wheels 54 connected thereto. Wheels 54 are located within wheel wells 52. A plurality of intermediate transverse frame members 56 are connected between longitudinal frame members 10 to provide added support for the frame assembly.

As best seen in FIG. 3, the lower edges of side rails 32 and 44, trailer frame members 22, and transverse frame members 56 are located at or above the lower peripheral edges 16 of longitudinal frame members 10. Additionally, it is preferable for the upper edges of longitudinal frame members 10, side rails 32 and 44, and frame members 56 to lie in substantially the same plane so as to provide a level support for flooring or similar overlying structural components.

Frame members 22 of trailer tongue 20 may be additionally connected by transverse members 60. Frame members 22 preferably lie in substantially the same plane as side rails 32. Coupler 30 which is carried at the forward ends 24 of frame members 22 includes a raised pyramidal gusset plate 62 which causes the lower edge 64 of the coupler socket portion to be positioned adjacent the upper edge 23 of frame members 22 to provide the fram assembly with a low profile. It is to be understood that the connection between the frame members and rails of the frame assembly can be accomplished by welding or a similar bonding process.

It is to be understood that the invention is not to be limited to the details above given but may be modified within the scope of the appended claims.

What we claim is:

1. An axled vehicle support frame assembly comprising two parallel longitudinal frame members each having opposite end portions tapered from a middle portion of maximum depth to front and rear ends of a minimum depth, a trailer tongue including two forwardly convergent frame members each having front and rear ends, a pair of spaced side rails, each longitudinal frame member having its front end joined to a tongue frame member between the ends of the tongue frame member, said side rails spaced laterally outwardly from and on opposite sides of said longitudinal frame members, said side rails being positioned not lower than the lower periphery of said longitudinal frame members, the rear end of each tongue frame member being connected to a said side rail, a transverse rail member extending across both said tongue frame members, said transverse rail member positioned spacedly forwardly of the front ends of said longitudinal frame members and being connected to said tongue frame members, each side rail having a forward end extending forwardly of the rear end of said tongue frame members and being connected to one end of said transverse rail member.

2. The frame assembly of claim 1 including a second pair of spaced side rails, a wheel and axle assembly means including a pair of wheels supporting said longitudinal frame members, each wheel positioned outwardly of a said longitudinal frame member at said middle portion of the longitudinal frame member, each first mentioned pair of side rails having a rear end terminating adjacently forwardly of a said wheel, said second pair of side rails being spaced laterally outwardly from and on opposite sides of said longitudinal frame members, each side rail of said second pair of side rails being connected to a said longitudinal frame member and having a front end terminating adjacently rearwardly of a said wheel.

3. The frame assembly of claim 1 and a coupler means for connecting said frame assembly to a vehicle, said coupler means carried at the forward ends of said tongue frame members and having a socket part located above the upper edge of said tongue frame members, said tongue frame members lying in substantially the same plane as said side rails.

* * * * *